United States Patent
Kijima et al.

(10) Patent No.: US 7,750,277 B2
(45) Date of Patent: Jul. 6, 2010

(54) OPTICAL SIGNAL TRANSMITTING APPARATUS, OPTICAL SIGNAL TRANSMITTING DEVICE, AND OPTICAL SIGNAL RECEIVING DEVICE

(75) Inventors: Masaru Kijima, Kanagawa (JP); Tsutomu Hamada, Kanagawa (JP); Shinobu Ozeki, Kanagawa (JP); Yoshihide Sato, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 12/121,884

(22) Filed: May 16, 2008

(65) Prior Publication Data
US 2009/0101797 A1    Apr. 23, 2009

(30) Foreign Application Priority Data
Sep. 10, 2007    (JP)    ............................. 2007-234452

(51) Int. Cl.
*G01J 1/44*    (2006.01)
(52) U.S. Cl. ................. 250/205; 250/214 R; 250/214.1; 324/537; 702/40; 372/38.01
(58) Field of Classification Search ................. 250/205, 250/206, 214 R, 214.1; 324/537; 702/40; 372/38.01
See application file for complete search history.

(56) References Cited

U.S. PATENT DOCUMENTS

| 5,850,409 A | * | 12/1998 | Link ........................ 372/38.01 |
| 6,990,412 B2 | * | 1/2006 | Zhang ........................... 702/40 |
| 2003/0141876 A1 | * | 7/2003 | Mahgerefteh et al. ....... 324/537 |

FOREIGN PATENT DOCUMENTS

JP    2002-353493    12/2002

* cited by examiner

*Primary Examiner*—Seung C Sohn
(74) *Attorney, Agent, or Firm*—Fildes & Outland, P.C.

(57) ABSTRACT

An optical signal transmitting apparatus includes a light-emitting element, a light-receiving section, a conductive line and a controller. The light-emitting element converts an electric signal into an optical signal. The light-receiving section converts the optical signal, which is received from the light-emitting element through an optical transmission medium, into an electric signal. The conductive line is connected to an output terminal of the light-receiving section. The light-receiving section outputs an analog signal through the output terminal. The controller controls an extinction ratio of the light-emitting element in accordance with a characteristic impedance of the conductive line.

8 Claims, 9 Drawing Sheets

OPTICAL SIGNAL TRANSMITTING APPARATUS, OPTICAL SIGNAL TRANSMITTING DEVICE, AND OPTICAL SIGNAL RECEIVING DEVICE

CROSS-REFERENCE TO RELATED APPLICATIONS

This application is based on and claims priority under 35 USC 119 from Japanese Patent Application No. 2007-234452 filed Sep. 10, 2007.

BACKGROUND

1. Technical Field

The invention relates to an optical signal transmitting apparatus, an optical signal transmitting device, and an optical signal receiving device.

2. Related Art

In recent years, with rapid development of a digital information processing technique, a demand for high speed, large capacity, and high reliability of a digital communication technique have been increased. Electric signal transmission using a printed-wiring board or a metal electric wire has its limits in data transmission speed and transmission distance because of degradation of a signal quality or an influence of electromagnetic noise. In order to solve these limits, an optical communication technique has been developed and has been put into practical use in various fields.

For example, in the case where signals are transmitted at high speed in the printed-wiring board, impedance mismatch may occur between an element such as an electronic component and a wiring. If such impedance mismatch occurs, signals may be reflected in a terminal of the wiring, thereby degrading signal waveforms. Accordingly, it cannot be expected to perform high-reliable signal transmission.

Generally, the characteristic impedance of the printed-wiring board depends on the width of a transmission line, an interlayer distance, and electric permittivity of a board material. However, in recent years, it is apt to be difficult to achieve the characteristic impedance matching because of multilayered board, high density, and non-uniformity of the terminal of an element.

SUMMARY

According to an aspect of the invention, an optical signal transmitting apparatus includes a light-emitting element, a light-receiving section, a conductive line and a controller. The light-emitting element converts an electric signal into an optical signal. The light-receiving section converts the optical signal, which is received from the light-emitting element through an optical transmission medium, into an electric signal. The conductive line is connected to an output terminal of the light-receiving section. The light-receiving section outputs an analog signal through the output terminal. The controller controls an extinction ratio of the light-emitting element in accordance with a characteristic impedance of the conductive line.

BRIEF DESCRIPTION OF THE DRAWINGS

Exemplary embodiment(s) of the invention will be described in detail based on the following figures, wherein:

FIG. 7 shows an example of the invention.

DETAILED DESCRIPTION

First Exemplary Embodiment

Figure 1:
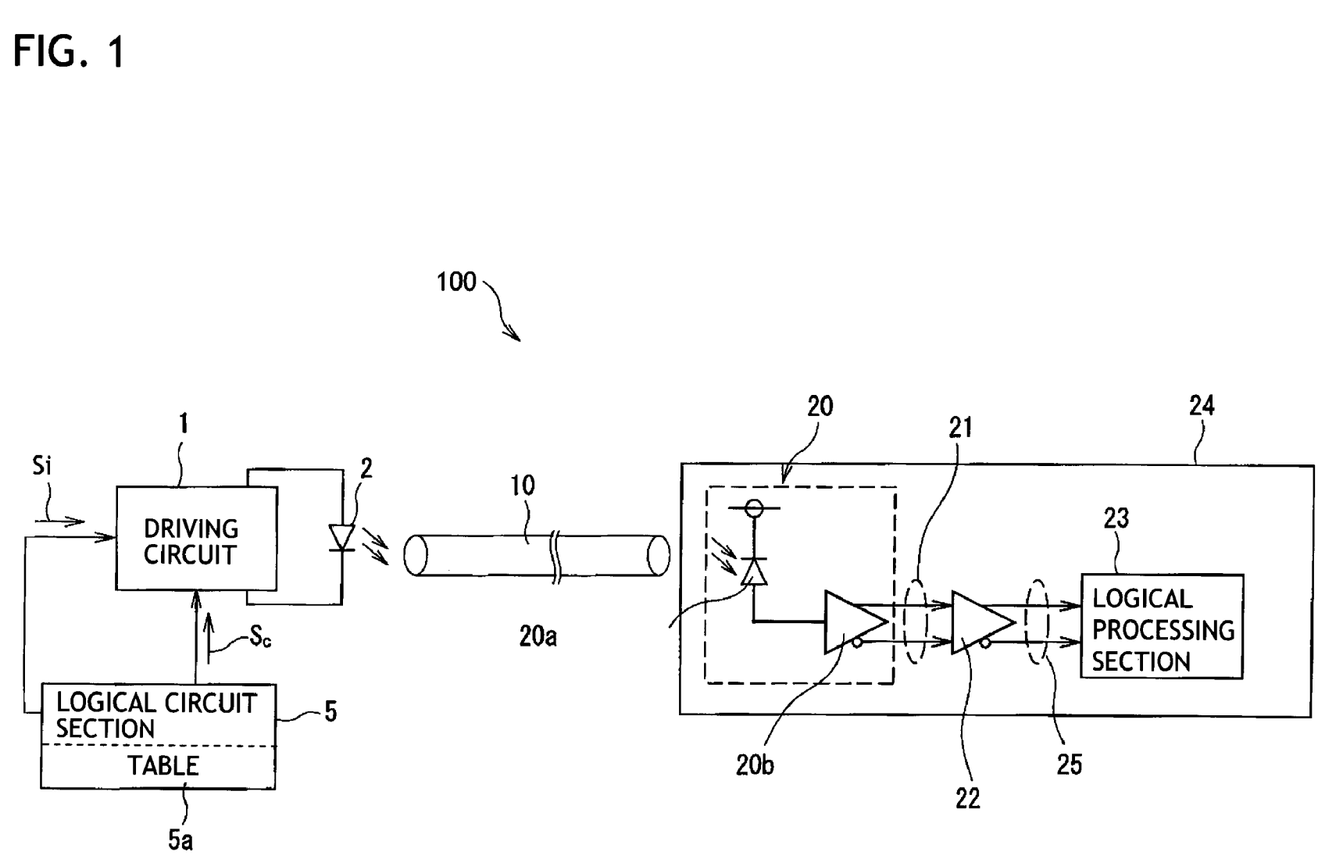
FIG. 1 is a connection diagram showing an optical signal transmitting apparatus according to a first exemplary embodiment of the invention.

FIG. 1 is a connection diagram showing an optical signal transmitting apparatus according to a first exemplary embodiment of the invention.

An optical signal transmitting apparatus 100 includes a driving circuit 1, a light-emitting element 2, a logical circuit section 5, an optical transmission medium 10, a light-receiving section 20, a second amplifier 22, a logical processing section 23 and a light-receiving circuit board 24. An input signal Si serving as a transmission signal is input to the driving circuit 1. The light-emitting element 2 is driven by the driving circuit 1. The logical circuit section 5 controls the driving circuit 1. The optical transmission medium 10 is formed of an optical fiber having one end, which is optically connected to a light-emitting surface of the light-emitting element 2. The light-receiving section 20 is optically connected to the other end of the optical transmission medium 10 and converts an optical signal received from the optical transmission medium 10 into an electric signal. The second amplifier 22 is connected to the light-receiving section 20 and performs A/D conversion for the electric signal received from the light-receiving section 20 to output the converted signal. The logical processing section 23 processes the electric signal received from the second amplifier 22. In the light-receiving circuit board 24, the light-receiving section 20, the second amplifier 22 and the logical processing section 23 are mounted. A wiring pattern (conductive line) 21 and a wiring pattern 25 are provided in the light-receiving circuit board 24.

The driving circuit 1 includes a driver IC having a circuit configuration for controlling an extinction ratio ER of the light-emitting element 2 so as to ensure reliability of optical communication, in accordance with the characteristic impedance of the wiring pattern 21 between the light-receiving section 20 and the second amplifier 22.

The light-emitting element 2 is, for example, a semiconductor laser, and the driving circuit 1 for driving this semiconductor laser includes, for example, a driver IC.

The logical circuit section 5 includes a CPU and a non-volatile memory (which are all not shown). The logical circuit section 5 and the driving circuit 1 constitute a controller. The logical circuit section 5 includes a table 5a which shows a relationship between the characteristic impedance of the wiring pattern 21 and the extinction ER and which is stored in the non-volatile memory.

The light-receiving section 20 includes a light-receiving element 20a for receiving the optical signal from the optical transmission medium 10 and a first amplifier 20b for converting current change in the light-receiving element 20a into voltage change to output the converted voltage change. The light-receiving element 20a is, for example, a photodiode (PD). The first amplifier 20b is, for example, a difference amplifier.

The second amplifier 22, which is connected to the first amplifier 20b with the wiring pattern 21 interposed therebetween, has a circuit configuration for converting an input signal into a binary signal, that is, a digital signal to output the converted digital signal to the logical processing section 23.

The logical processing section 23, which includes a CPU and a memory in the same manner as the logical circuit section 5, processes the signal received from the second amplifier 22 through the wiring pattern 25 as data and stores the processed signal in the memory, or performs a process of converting the signal into data in a desired format.

The wiring pattern 21 is designed so as to have a value close to the impedance (for example, 50Ω) of an output stage of the first amplifier 20b and an input stage of the second amplifier 22. In the wiring pattern 25, the transmitted signal is a digital-level signal. Therefore, an influence of signal degradation caused by characteristic impedance mismatch is small, as compared with an analog-level signal in the wiring pattern 21. If the impedance mismatch occurs between the wiring pattern 21 and the element in the front or rear thereof (in this case, the first amplifier 20b or the second amplifier 22), a reflection signal is generated in the terminal of the wiring pattern 21, which would become a cause of degrading the transmitted signal.

(Operation of Optical Signal Transmitting Apparatus)

Figure 2:
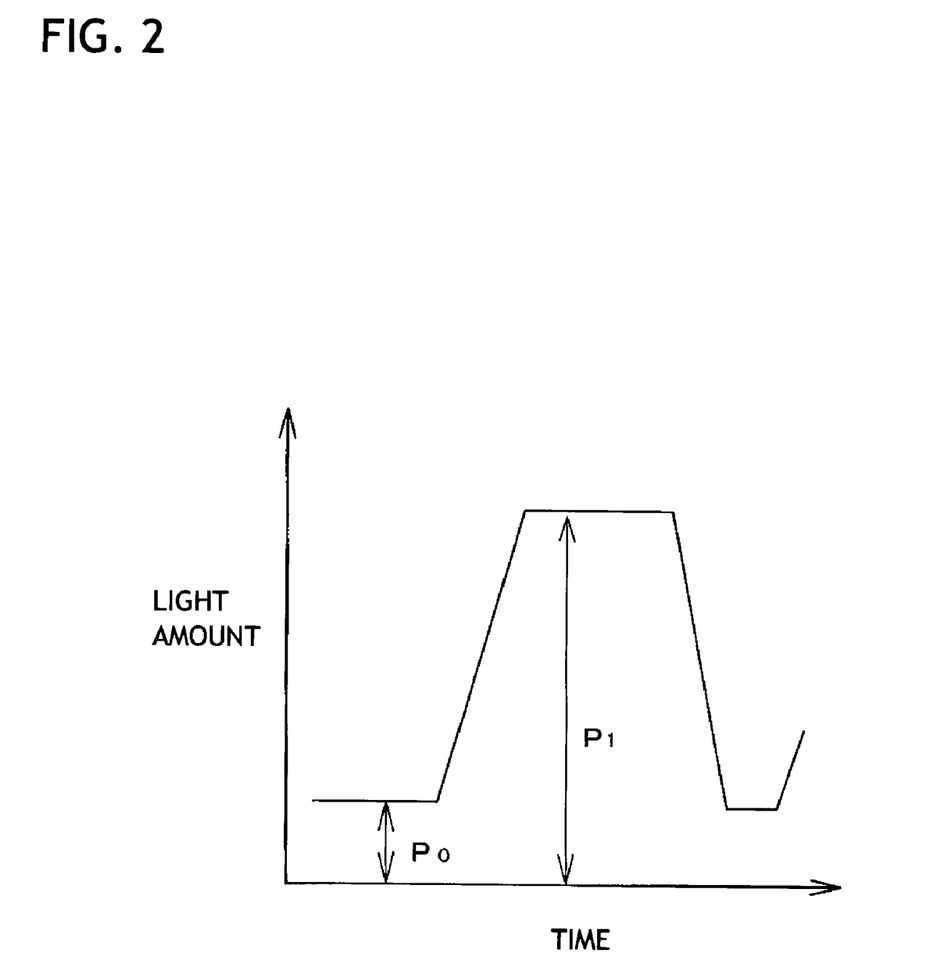
FIG. 2 is a characteristic diagram showing a relationship between a light amount of a light-emitting element and an extinction ratio of the light-emitting element.
Figure 3A:
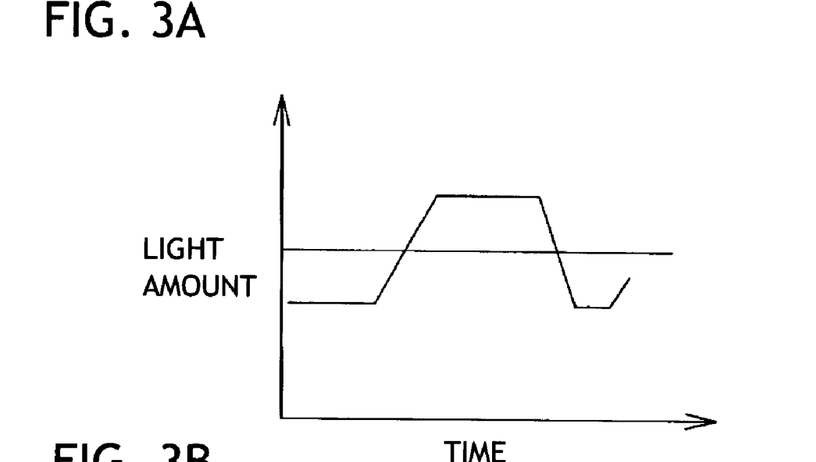
FIGS. 3A to 3C are diagrams illustrating for explaining the extinction ratio.
Figure 3B:
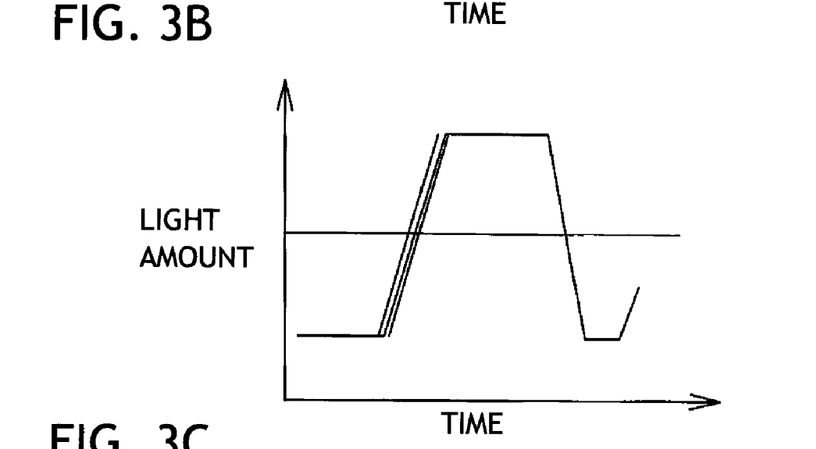
Figure 3C:
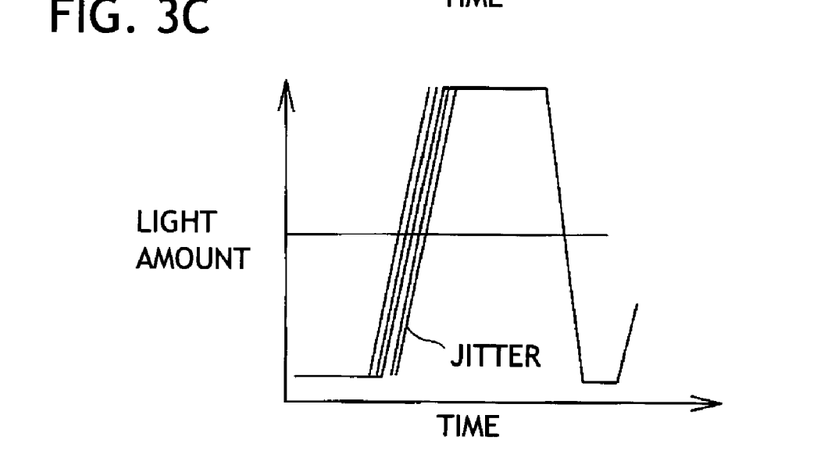

FIG. 2 is a diagram illustrating a relationship between a light amount of the light-emitting element and an extinction ratio of the light-emitting element. FIG. 3 is a diagram for explaining the extinction ratio.

First, in a state where electronic elements are not mounted on the light-receiving circuit board 24, a test signal is input to one end of the wiring pattern 21 from a signal output terminal of a measuring device (not shown) such as a network analyzer. A reflected voltage generated in the other end (mismatch portion) of the wiring pattern 21 is acquired from a signal detection terminal of the measuring device, and the characteristic impedance is calculated by an exclusive TRD (Time Domain Reflectometry) module and stored as data. Furthermore, the calculated characteristic impedance is display on the measuring device.

Next, the electronic elements such as the light-receiving section 20, the amplifier 22, and the logical processing section 23, and a connector are mounted onto the light-receiving circuit board 24, which is a target of the characteristic-impedance measurement, or a light-receiving circuit board 24 of the same lot.

In the configuration shown in FIG. 1, it is grasped in advance how a signal in the output terminal of the light-receiving section 20 deteriorates, by variously changing a combination of the characteristic impedance of the wiring pattern 21 and the extinction ratio ER of the light-emitting element 2 with the characteristic impedance being changed around 50Ω. FIG. 3 shows change in waveforms in this case. The relationship between the characteristic impedance and the extinction ratio ER obtained in this manner is stored in advance in the table 5a of the logical circuit section 5. Also, an impedance value of the wiring pattern 21 of the light-receiving circuit board 24 to be used is specified and recorded.

Next, when a transmission command is issued from a host device to the logical circuit section 5, the logical circuit section 5 reads the extinction ratio ER as a control signal Sc from the table Sa and reads the input signal Si to output them to the driving circuit 1. The driving circuit 1 controls current flowing through the light-emitting element 2 to obtain an optimum extinction ratio ER. In this way, the light-emitting element 2 is driven with a predetermined extinction ratio ER as shown in FIG. 2. In this case, the extinction ratio ER is expressed by the following Expression:

$$ER = 10 \times \log_{10}(P1/P0) \qquad (1)$$

where P1 denotes the maximum amount of light and P0 denotes the minimum amount of light (see FIG. 2).

As is clear from Expression (1), when a ratio of the light amount P1 to the light amount P0 is increased, the extinction ratio ER is increased and a signal level is increased as compared with no-signal time. Thereby, it is possible to improve the reliability of the optical communication.

However, as the extinction ratio ER is changed from a small state shown in FIG. 3A through an intermediate state shown in FIG. 3B to a large state shown in FIG. 3C, jitter that is signal transition variation increases in a time axis direction due to a characteristic of the light-emitting element 2, which is a cause of deteriorating the reliability of the optical communication. Accordingly, there is the optimum extinction ratio ER for the reliability of the optical communication.

An optical signal emitted by the light-emitting element 2 is incident to one end of the optical transmission medium 10, which is optically connected to the light-emitting element 2, propagates through the optical transmission medium 10 to reach the other end thereof propagating, and is incident to the light-receiving element 20a, which is optically connected to the other end of the optical transmission medium 10. The light-receiving element 20a converts the optical signal into current and outputs the current. The current is converted into an analog voltage by the first amplifier 20b, and the analog voltage is output to the wiring pattern 21 as an electric signal. After the electric signal, which is the analog signal and is output from the wiring pattern 21, is converted into a digital signal (binary signal) by the second amplifier 22, the digital signal is output to the logical processing section 23 through the wiring pattern 25. Then, a predetermined process is performed for the digital signal by the logical processing section 23.

Once the light-emitting element 2 generates the jitter as shown in FIGS. 3B and 3C, it is difficult to decrease the jitter in the transmission path from the optical transmission medium 10 to the first amplifier 20b. Thus, the electric signal output by the first amplifier 20b contains the jitter.

The electric signal, which contains the jitter and is output from the first amplifier 20b, is transmitted to the second amplifier 22 through the wiring pattern 21. At this time, the electric signal is influenced by impedance matching of the wiring pattern 21 of the light-receiving circuit board 24. It is desirable that the characteristic impedance of the wiring pattern 21 is matched with the terminal thereof. However, if the impedance mismatch occurs, a reflection signal would be made in the terminal of the wiring pattern 21, thereby degrading the reliability of the transmitted signal. Also, the larger the impedance mismatch is, the more greatly the electric signal is influenced by the jitter.

However, in this exemplary embodiment, as described above, the extinction ratio ER of the light-emitting element 2 is controlled by the logical circuit section 5 and the driving circuit 1 in accordance with the characteristic impedance of the wiring pattern 21. Accordingly, it is possible to realize optical communication that is suitable for the characteristic impedance of the wiring pattern 21.

The logical circuit section 5 may control the extinction ratio ER, which is performed by controlling any of a modulation current for modulating the light-emitting element 2, a bias current for the light-emitting element 2, a monitor-photodiode current for uniformly maintaining an average light amount of the light-emitting element 2, or a combination thereof.

Second Exemplary Embodiment

Figure 4:
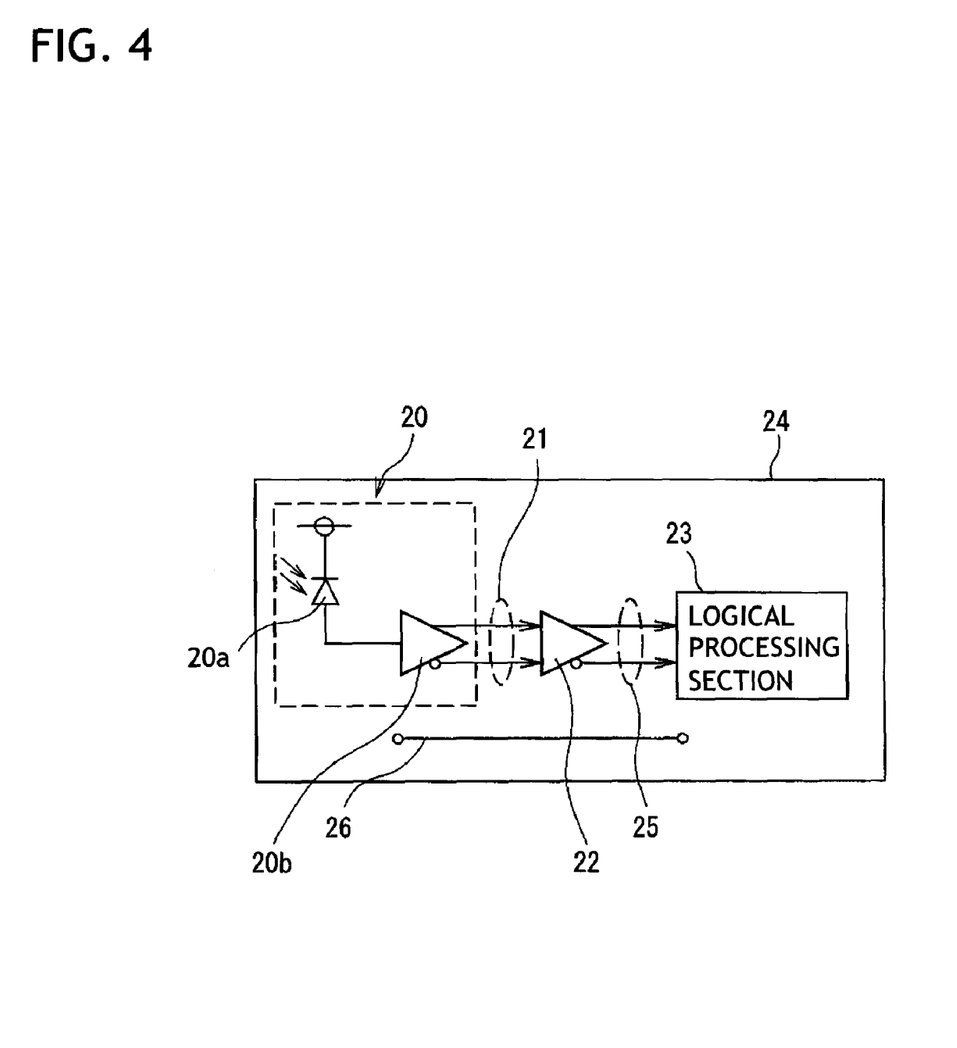
FIG. 4 is a connection diagram showing an optical signal transmitting apparatus according to a second exemplary embodiment of the invention.

FIG. 4 is a connection diagram showing an optical signal transmitting apparatus according to a second exemplary embodiment. In FIG. 4, a light-emitting side and an optical transmission medium 10 are not shown.

In this exemplary embodiment, a test pattern (wiring pattern) 26 that is used to grasp (estimate) the characteristic impedance of the wiring pattern 21 is provided in the light-receiving circuit board 24, and the remaining configuration is the same as that of the first exemplary embodiment. The test pattern 26 reflects the characteristic impedance of the wiring pattern 21. For example, the test pattern 26 may be equivalent to the characteristic impedance of the wiring pattern 21, or may have such a characteristic impedance that a ratio of the characteristic impedance of the test pattern 26 to that of the wiring pattern 21 is equal to a predetermined ratio. The test pattern 26 has a single straight line shape, but may have the exactly same shape, size, and thickness as the wiring pattern 21.

In the first exemplary embodiment, the characteristic impedance of the wiring pattern 21 is directly measured by the measuring device. However, in the second exemplary embodiment, the characteristic impedance of the wiring pattern 21 is estimated by measuring the characteristic impedance of the test pattern 26.

The characteristic impedance of the test pattern 26 is measured by inputting a test signal into one end of the test pattern 26 from a signal output terminal of a measuring device such as a network analyzer and acquiring a reflected voltage that is generated in the other end of the test pattern 26 from a signal detection terminal of the measuring device to calculate the characteristic impedance. Also, the calculated characteristic impedance may be stored as data and may also be displayed on a display screen of the measuring device.

The relationship between the characteristic impedance and the extinction ratio ER obtained in this way is stored in the table 5a of the logical circuit section 5 shown in FIG. 1. The data in the table 5a is read as a driving-condition control signal Sc by the logical circuit section 5 when the optical signal is to be transmitted, and this data and an input signal Si are applied to the driving circuit 1. The driving circuit 1 drives the light-emitting element 2 based on the driving-condition control signal Sc and the input signal Si.

The optical signal emitted from the light-emitting element 2 reaches the light-receiving section 20 through the optical transmission medium 10. An operation performed by the light-receiving circuit board 24 is the same as that of the first exemplary embodiment. Thus, description thereon will be omitted.

Third Exemplary Embodiment

Configuration of Optical Signal Transmitting Apparatus

Figure 5:
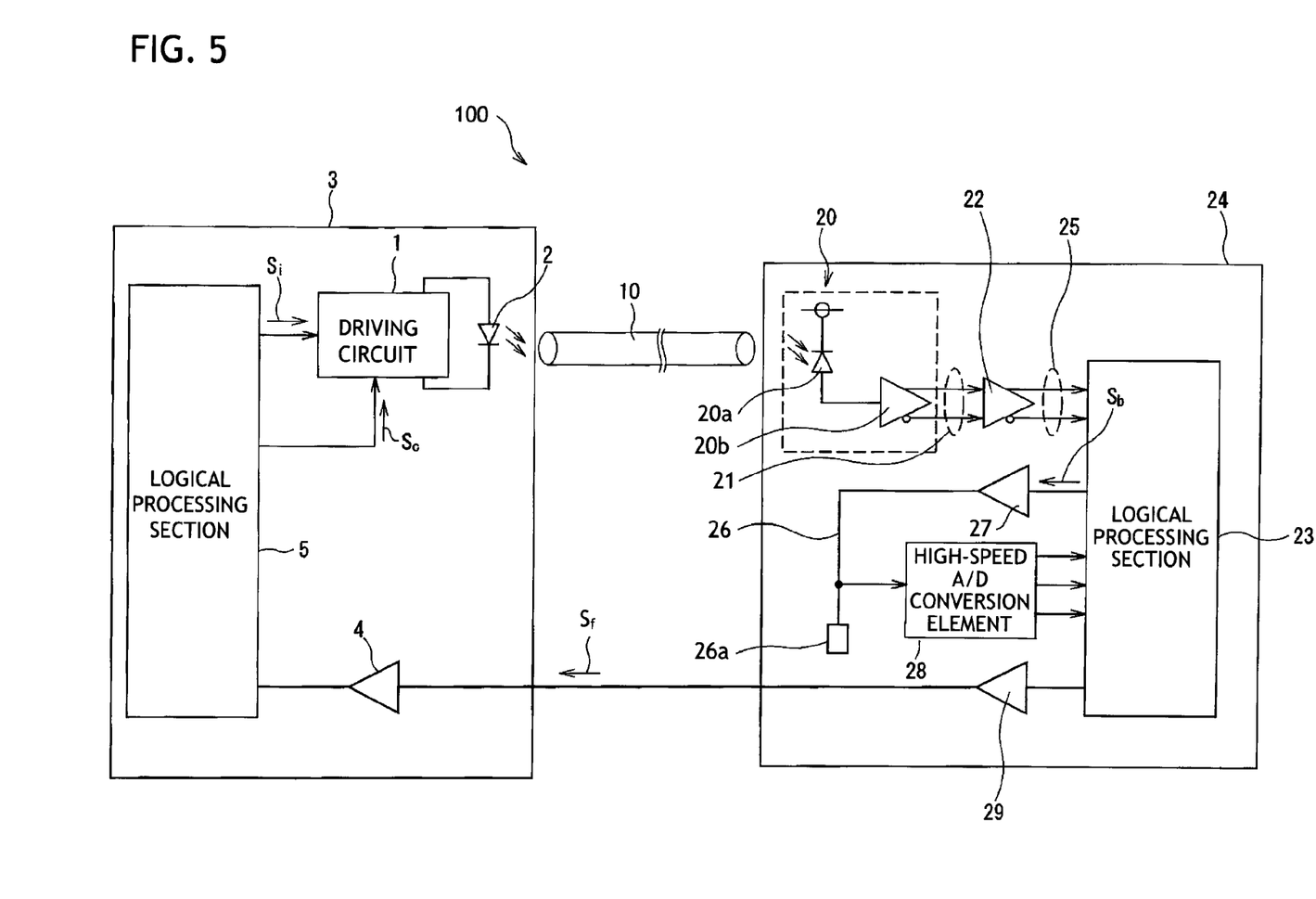
FIG. 5 is a connection diagram showing an optical signal transmitting apparatus according to a third exemplary embodiment of the invention.

FIG. 5 is a connection diagram showing an optical signal transmitting apparatus according to a third exemplary embodiment of the invention. In FIG. 5, the logical processing section includes the table 5a (not shown).

In the second exemplary embodiment, the characteristic impedance of the test pattern 26 is measured with the measuring device by applying the test signal to the test pattern 26 from the outside and by acquiring the reflected voltage at that time to perform the arithmetic process. To the contrary, in this exemplary embodiment, a reflected voltage of a test pattern 26 is automatically measured, and an arithmetic process for estimating a characteristic impedance is performed on the light-receiving circuit board 24. The remaining configuration is the same as that of the first exemplary embodiment. In FIG. 5, the logical circuit section 5 and the driving circuit 1 constitute a controller. A logical processing section 23, a buffer amplifier 27, and a high-speed A/D conversion element 28 constitute a measuring unit.

In a light-emitting side, the driving circuit 1, the light-emitting element 2, and the logical circuit section 5 are mounted on the light-emitting circuit board 3. Also, a buffer amplifier 4 for buffering and amplifying a feedback signal that is received from the light-receiving side is mounted on the light-emitting circuit board 3.

In the light-receiving side, the light-receiving section 20, the second amplifier 22, the logical processing section 23, the buffer amplifier 27 for applying a reference signal Sb that is input from the logical processing section 23 to the test pattern 26, the high-speed A/D conversion element 28 for performing A/D conversion for a signal received from the test pattern 26, and a buffer amplifier 29 for buffering and amplifying a signal that is received from the logical processing section 23 and outputs the signal as a feedback signal Sf to the buffer amplifier 4 are amounted on the light-receiving circuit board 24.

(Operation of Optical Signal Transmitting Apparatus)

First, in the light-receiving side, the reference signal (test signal) Sb is output from the logical processing section 23 and applied to the test pattern 26 through the buffer amplifier 27. The reference signal Sb propagates through the test pattern 26 and reaches a reference terminal 26a. Since the reference signal Sb propagating through the test pattern 26 is reflected at the reference terminal 26a, a reflection signal Sr is generated. The reflection signal Sr is input to the high-speed A/D conversion element 28.

The high-speed A/D conversion element 28 converts the reflection signal Sr into a digital signal and outputs the digital signal to the logical processing section 23. The logical processing section 23 calculates a variation value $\Delta V$ of the reflected voltage using the following expression:

$$\Delta V = V_0 \{(Z_{ref} - Z)/(Z_{ref} + Z)\} \quad (2)$$

where $Z_{ref}$ denotes an impedance of the reference terminal 26a, and

Z denotes a characteristic impedance of the test pattern 26.

Based on Expression (2), the characteristic impedance Z of the wiring pattern 21 can be estimated using the following Expression (3):

$$Z=Z_{ref}\{(V_0-\Delta V)/(V_0+\Delta V)\} \quad (3)$$

The calculation of the characteristic impedance Z based on Expression (3) may be performed by the logical processing section 23 or the logical circuit section 5. In this exemplary embodiment, the calculating is performed by the logical processing section 23.

The logical processing section 23 feedbacks the variation ΔV of the reflected voltage to the light-emitting side through the buffer amplifier 29 as the feedback signal Sf. The feedback signal Sf is received by the buffer amplifier 4 and applied to the logical circuit section 5.

When the feedback signal Sf is input from the buffer amplifier 4 to the logical circuit section 5, a driving-condition control signal Sc is generated in accordance with an extinction ratio ER, which is determined from the table 5a based on the characteristic impedance Z. Also, the logical circuit section 5 generates an input signal Si and outputs the input signal Si and the driving-condition control signal Sc to the driving circuit 1. The driving circuit 1 controls current of the light-emitting element 2 based on the input signal Si and the driving-condition control signal Sc.

An optical signal emitted from the light-emitting element 2 is incident to the light-receiving element 20a through the optical transmission medium 10 and is converted into current by the light-receiving element 20a. The current is converted into an analog voltage by the first amplifier 20b and is output to the wiring pattern 21 as an electric signal. After the electric signal transmitted from the wiring pattern 21 is converted from the analog signal into a digital signal (binary signal) by the second amplifier 22, the converted digital signal is output to the logical processing section 23 through the wiring pattern 25. Then, a predetermined process is performed for the digital signal by the logical processing section 23.

Fourth Exemplary Embodiment

Figure 6:
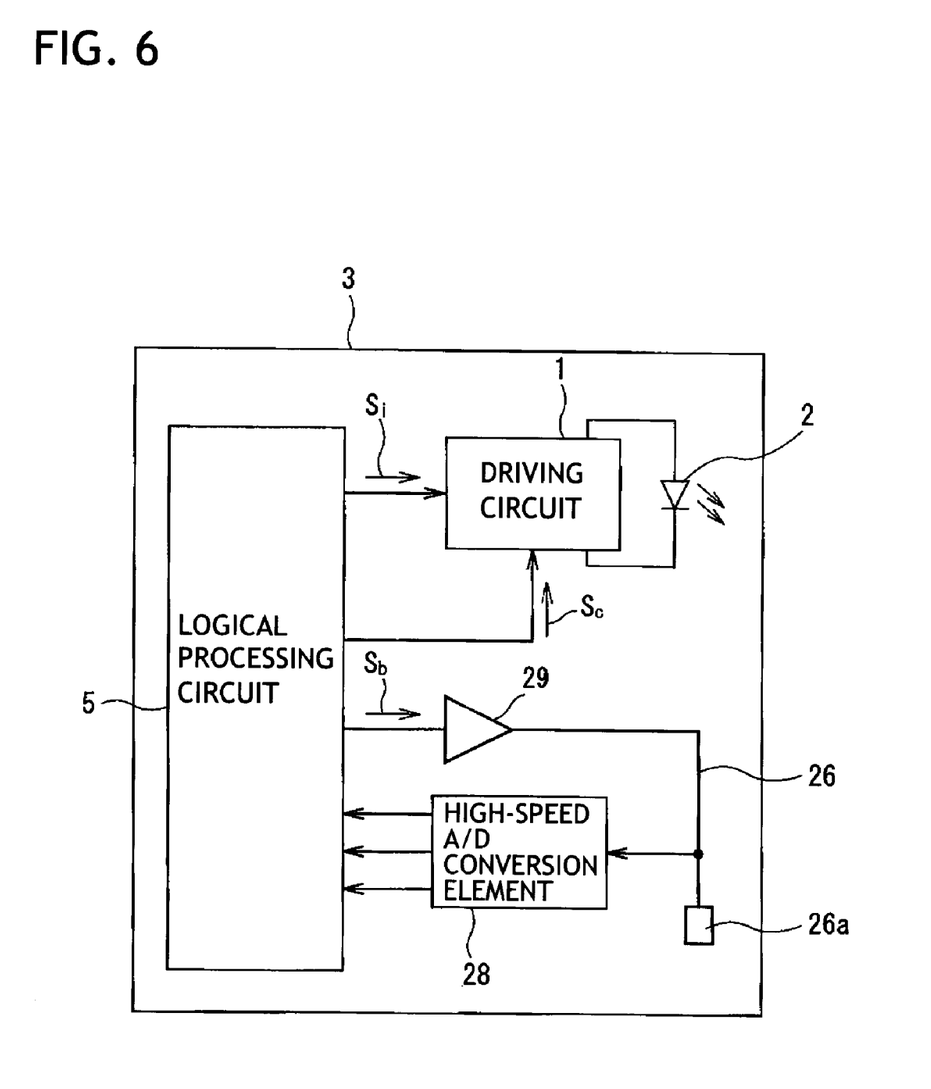
FIG. 6 is a connection diagram showing an optical signal transmitting apparatus according to a fourth exemplary embodiment of the invention.

FIG. 6 is a connection diagram showing an optical signal transmitting apparatus according to a fourth exemplary embodiment of the invention.

In the third exemplary embodiment, the test pattern 26, the reference terminal 26a, the buffer amplifier 27, and the high-speed A/D conversion element 28 are mounted on the light-receiving circuit board 24. To the contrary, in this exemplary embodiment, the test pattern 26, the reference terminal 26a, the buffer amplifier 27, and the high-speed A/D conversion element 28 are mounted on the light-emitting circuit board 3. Also, the logical circuit section 5 performs the arithmetic process based on Expressions (2) and (3) to generate the driving-condition control signal Sc. Accordingly, in the fourth exemplary embodiment, it is not necessary to transmit the feedback signal Sf from the light-receiving circuit board 24 to the light-emitting side. The remaining configuration is the same as that of the second exemplary embodiment. The logical circuit section 5, the high-speed A/D conversion element 28, and the buffer amplifier 29 constitute a controller.

The characteristic impedance of the wiring pattern 21 provided in the light-receiving circuit board 24 is reflected to the test pattern 26. For example, the test pattern 26 may be equivalent to the characteristic impedance of the wiring pattern 21, or may have such a characteristic impedance that a ratio of the characteristic impedance of the test pattern 26 to that of the wiring pattern 21 is equal to a predetermined ratio.

In recent years, in a process of manufacturing a printed-wiring board, plural types of small-sized boards are arranged in a large-sized board to obtain many surfaces. In this case, if a material characteristic and precision of a mask are uniform to some extent, it is considered that mismatch degree of the characteristic impedance in the large-sized board is substantially uniform.

Accordingly, in the case where the light-emitting circuit board 3 and the light-receiving circuit board 24 are manufactured from the same board, the logical processing section 5 estimates the characteristic impedance of the wiring pattern 21 using the test pattern 26 provided on the light-emitting circuit board 3 by performing the measuring method described in the third exemplary embodiment. Also, based on the estimated result, the logical circuit section 5 controls a driving condition of the light-emitting element 2.

Example 1

Figure 7A:
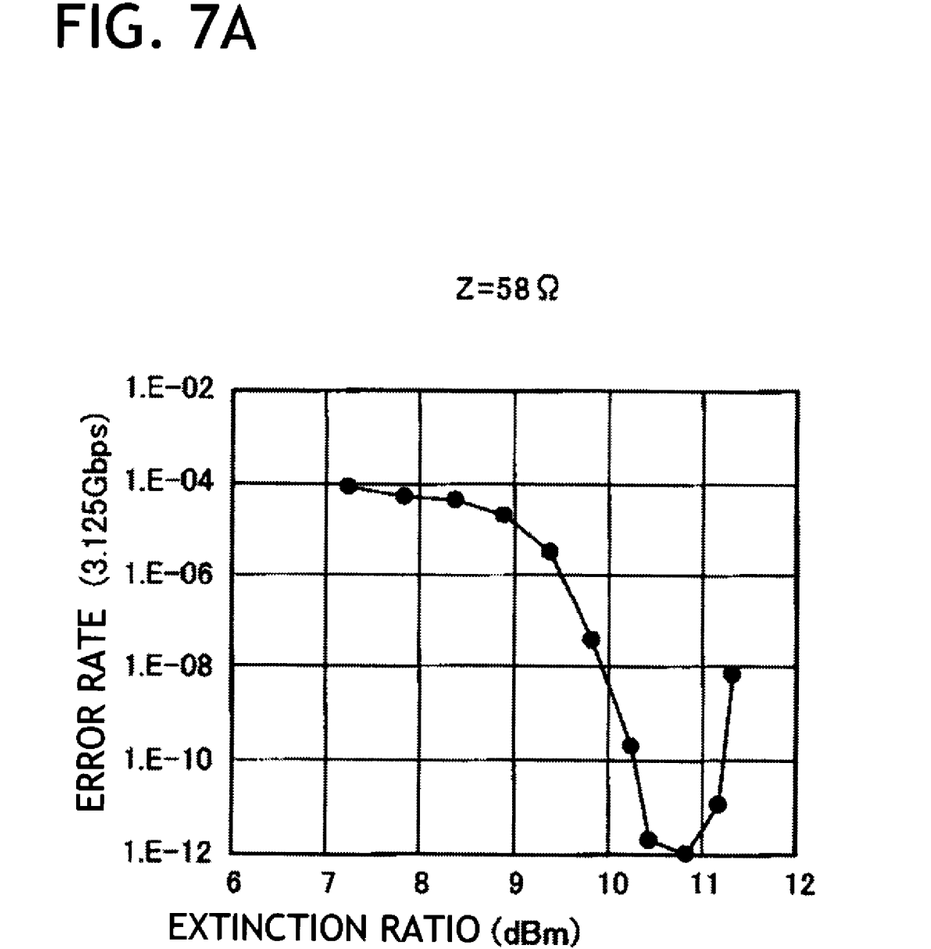
FIG. 7A is a characteristic diagram showing a relationship between an extinction ratio ER and an error rate in the case where the characteristic impedance of a wiring pattern is 58Ω.
Figure 7B:
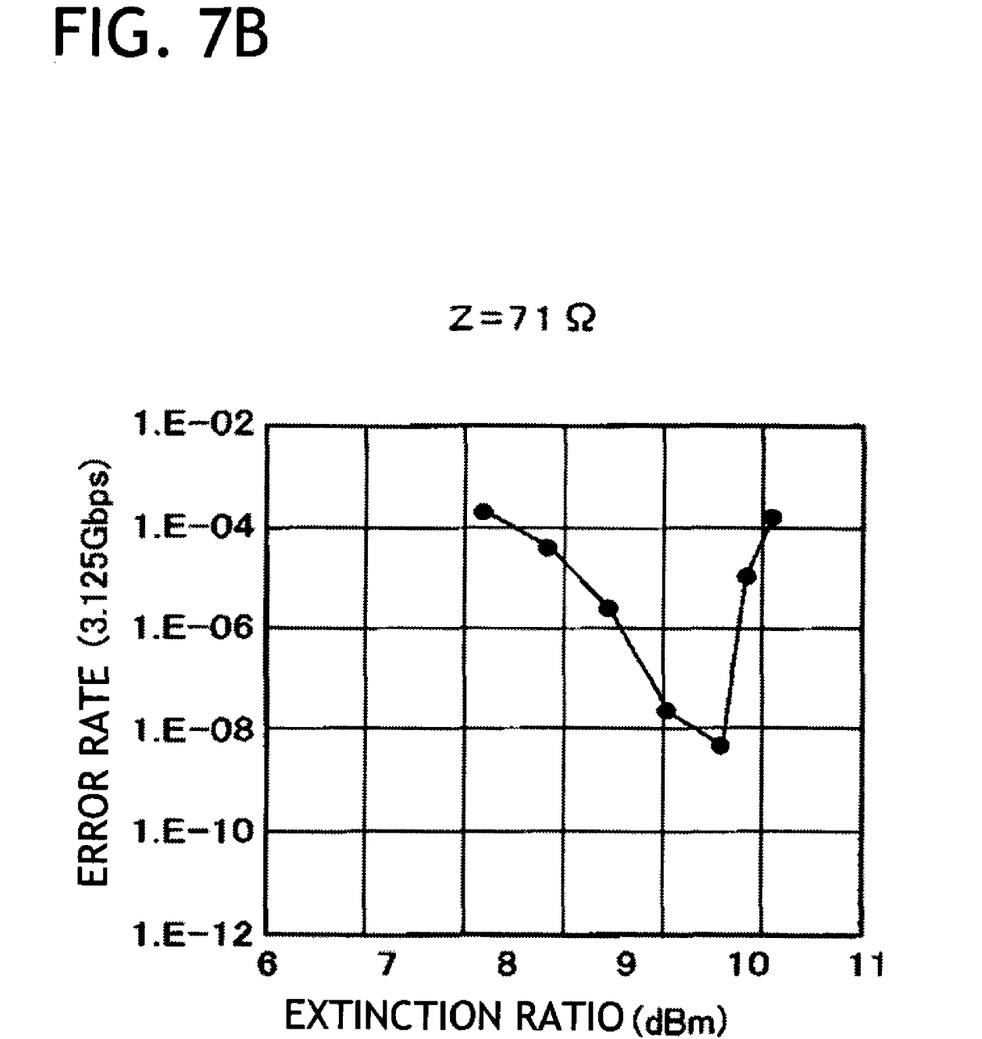
FIG. 7B is a characteristic diagram showing the relationship between the extinction ratio ER and the error rate in the case where the characteristic impedance of the wiring pattern is 71Ω.
Figure 7C:
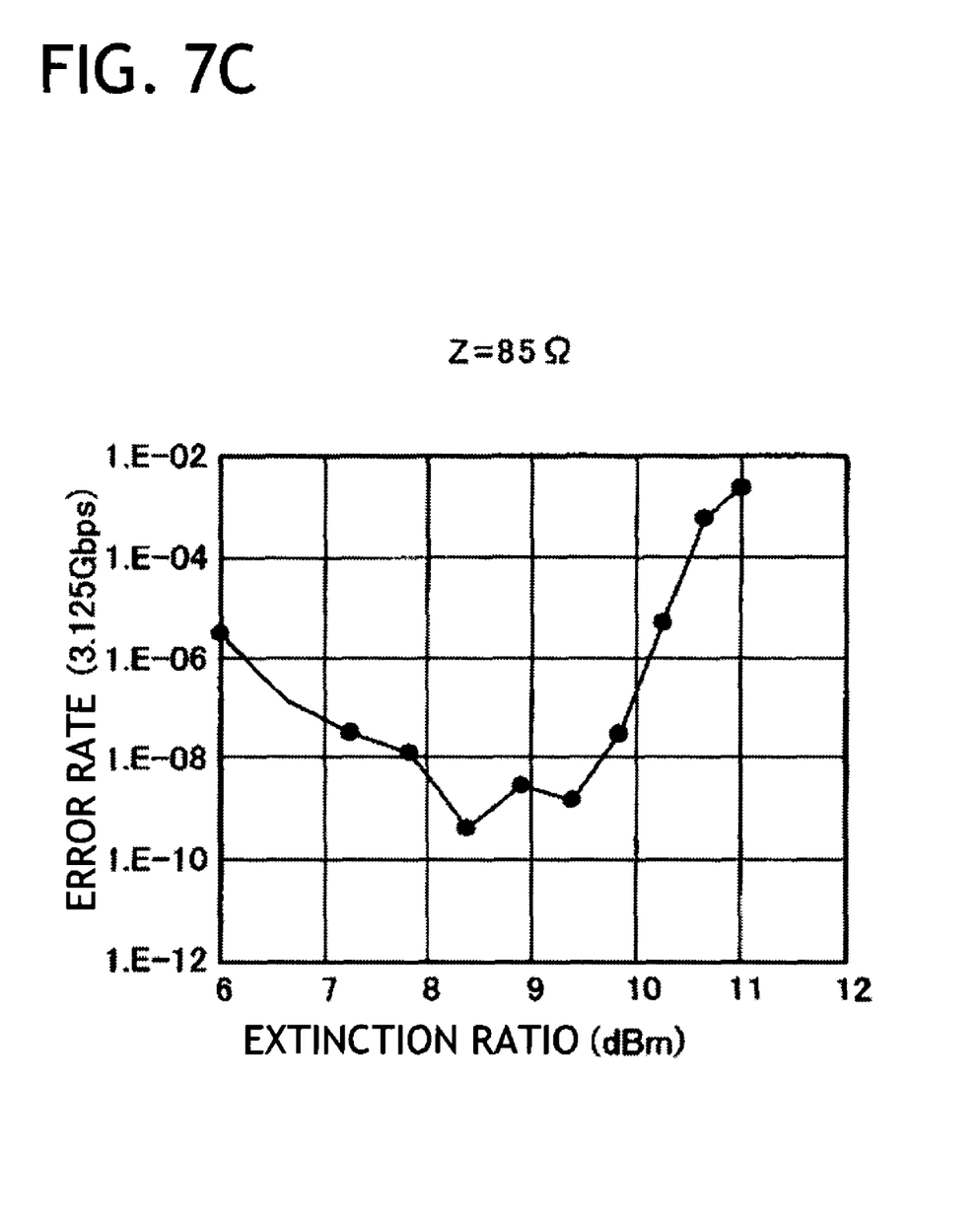
FIG. 7C is a characteristic diagram illustrating the relationship between the extinction ratio ER and the error rate in the case where the characteristic impedance of the wiring pattern is 85 Ω.

FIG. 7 shows Examples of the invention. FIG. 7A is a diagram illustrating a relationship between the extinction ratio ER and the error rate in the case where the characteristic impedance of a wiring pattern is 58Ω. FIG. 7B is a diagram illustrating a relationship between the extinction ratio ER and the error rate in the case where the characteristic impedance of the wiring pattern is 71Ω. FIG. 7C is a diagram illustrating a relationship between the extinction ratio ER and the error rate in the case where the characteristic impedance of the wiring pattern is 85 Ω.

As shown in FIGS. 7A to 7C, optimum extinction ratios ER for the characteristic impedances Z of 58 Ω, 71Ω, and 85Ω are about 10.8 dBm, about 9.8 dBm, and about 8.4 dBm, which are different from each other. Also, as shown in FIGS. 7A to 7C, it can be seen that a higher extinction ratio ER can be obtained as the characteristic impedance Z is closer to 50Ω which is an ideal value. As the mismatch of the characteristic impedance Z is larger, the reflected degree of a signal in the terminal is larger. Accordingly, it can be seen that even slight jitter component affects the error rate.

Other Exemplary Embodiments

The invention is not limited to the above-described exemplary embodiments, but may be modified in various manners within the scope of the invention without departing the gist of the invention. For example, the feedback from the light-receiving side to the light-emitting side may be carried bout not by an electric signal, but by an optical signal.

In the second exemplary embodiment shown in FIG. 4, the test pattern 26 may be provided in the light-emitting side. In this case, the measurement and process for the test pattern 26, which are performed by the measuring device, can be made in the manner described in the second exemplary embodiment.

What is claimed is:
1. An optical signal transmitting apparatus comprising:
 a light-emitting element that converts an electric signal into an optical signal;
 a light-receiving section that converts the optical signal, which is received from the light-emitting element through an optical transmission medium, into an electric signal;
 a conductive line that is connected to an output terminal of the light-receiving section, wherein the light-receiving section outputs an analog signal through the output terminal; and a controller that controls an extinction ratio of the light-emitting element in accordance with a characteristic impedance of the conductive line.

2. The optical signal transmitting apparatus according to claim 1, further comprising:
  a light-receiving circuit board on which the light-receiving section is mounted and the conductive line is formed; and
  a wiring pattern that is provided on the light-receiving circuit board so that the characteristic impedance of the conductive line is reflected thereto, wherein
  the controller controls the extinction ratio of the light-emitting element in accordance with the characteristic impedance of the conductive line, which is estimated based on a measurement result of a reflection signal that is obtained by applying a test signal to the wiring pattern.

3. The optical signal transmitting apparatus according to claim 1, further comprising:
  a light-emitting circuit board on which the light-emitting element is mounted; and
  a wiring pattern that is provided on the light-emitting circuit board so that the characteristic impedance of the conductive line is reflected thereto, wherein
  the controller controls the extinction ratio of the light-emitting element in accordance with the characteristic impedance of the conductive line, which is estimated based on a measurement result of a reflection signal that is obtained by applying a test signal to the wiring pattern.

4. The optical signal transmitting apparatus according to claim 2, further comprising:
  a measuring unit that measures the reflection signal, which is obtained by applying a test signal to the wiring pattern, the measuring unit that estimates the characteristic impedance of the conductive line based on the measurement result, wherein
  the electric signal into which the light-receiving section converts the optical signal is an analog electric signal.

5. The optical signal transmitting apparatus according to claim 3, wherein:
  the controller is mounted on the light-emitting circuit board,
  the controller measures the reflection signal, which is obtained by applying the test signal to the wiring pattern,
  the controller estimates the characteristic impedance of the conductive line based on the measurement result and controls the extinction ratio of the light-emitting element based on the characteristic impedance of the conductive line, and
  the electric signal into which the light-receiving section converts the optical signal is an analog electric signal.

6. An optical signal transmitting device comprising:
  a light-emitting element that converts an electric signal into an optical signal to output the optical signal to an optical transmission medium; and
  a driving unit that sets an extinction ratio of the light-emitting element based on a characteristic impedance of a conductive line for transmitting an analog electric signal from a light-receiving section that receives the optical signal output by the light-emitting element through the optical transmission medium, the driving unit that drives the light-emitting element in accordance with the extinction ratio.

7. The optical signal transmitting device according to claim 6, further comprising:
  a light-emitting circuit board on which the light-emitting element is mounted; and
  a wiring pattern that is provided on the light-emitting circuit board so that the characteristic impedance of the conductive line connected to a light-receiving section on a receiving side is reflected thereto, wherein
  the driving unit is mounted on the light-emitting circuit board,
  the driving unit measures a reflection signal that is obtained by applying a test signal to the wiring pattern,
  the driving unit estimates the characteristic impedance of the conductive line based on the measurement result and sets the extinction ratio of the light-emitting element based on the characteristic impedance of the conductive line.

8. An optical signal receiving device comprising:
  a light-receiving section that converts an optical signal received through an optical transmission medium, into an analog electric signal;
  a conductive line that is connected to an output terminal of the light-receiving section;
  a light-receiving circuit board on which the light-receiving section is mounted and the conductive line is formed;
  a wiring pattern that is provided on the light-receiving circuit board so that a characteristic impedance of the conductive line is reflected thereto; and
  a processing section that estimates the characteristic impedance of the conductive line based on a reflection signal that is generated when a test signal is applied to the wiring pattern, the processing section that supplies the estimated result to a transmitting side.

\* \* \* \* \*